United States Patent [19]

Irie

[11] Patent Number: 4,486,259
[45] Date of Patent: Dec. 4, 1984

[54] BEAD LOCK MEANS FOR TIRE-FORMING DRUM

[75] Inventor: Nobuhiko Irie, Nagasaki, Japan

[73] Assignee: Mitsubishi Jukogyo Kabushiki Kaisha, Japan

[21] Appl. No.: 384,954

[22] Filed: Jun. 4, 1982

[30] Foreign Application Priority Data

Jun. 12, 1981 [JP] Japan ................................ 56-90426

[51] Int. Cl.³ ........................................... B29H 17/26
[52] U.S. Cl. .................................... 156/398; 156/415; 156/416; 156/110.1
[58] Field of Search ......................... 156/398, 399–403, 156/414–420, 394.1, 422, 135, 131–132, 110.1

[56] References Cited

U.S. PATENT DOCUMENTS 4,001,070 1/1977 Bell ....................................... 156/398
4,045,277 8/1977 Habert et al. ........................ 156/400

FOREIGN PATENT DOCUMENTS 546266 3/1968 Japan .
5037720 3/1973 Japan .
53-5349 2/1978 Japan .
55-32544 2/1980 Japan .

Primary Examiner—Lois E. Boland
Attorney, Agent, or Firm—McGlew and Tuttle

[57] ABSTRACT

A bead lock device comprises mutually separable and engageable shafts, and a pair of left and right bead lock members consisting of a plurality of segments, each segment having one end pivoted to the shafts and the other end adapted to expand in diameter in the radial direction and to hold the bead portion of a green tire case in substantially circular form. A slide member capable of moving in the radial direction of the shafts is provided and is connected to the segments through a link member for expanding and contracting the diameter of the segments in the radial direction through a link mechanism. A mechanism for moving the slide member in the direction of an expansion in diameter is provided for the segments and also provided is a mechanism for moving the segments in the direction of contraction in diameter of said segments.

3 Claims, 1 Drawing Figure

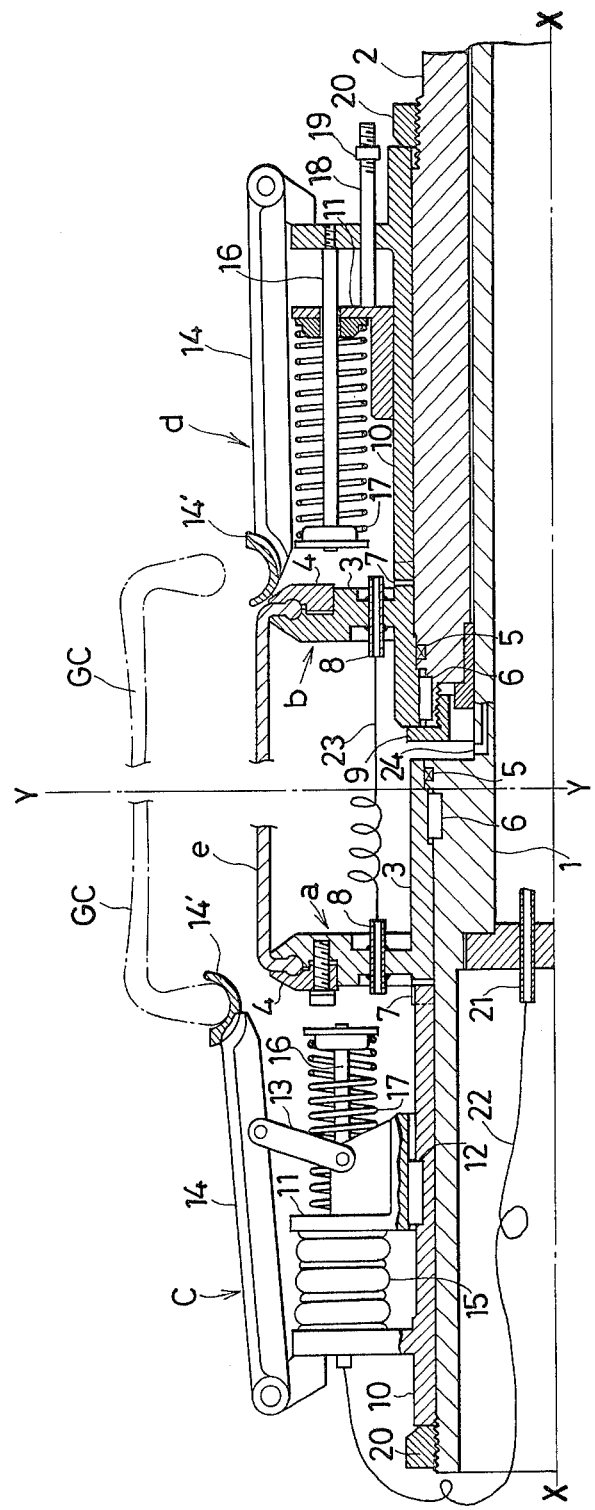

BEAD LOCK MEANS FOR TIRE-FORMING DRUM

FIELD AND BACKGROUND OF THE INVENTION

The present invention relates to improvements in bead lock means for a tire-forming drum of a second-stage apparatus for use in a tire-forming method of the second-stage type in the manufacture of radial tires.

In the manufacture of such radial tires, a tire-forming method of the second-stage type has heretofore been adopted extensively. According to this method, after a cylindrical green case has been formed by an apparatus of the first stage, it is conveyed to an apparatus of the second stage where the green case is arranged at said apparatus and formed in a toroidal shape and further, a belt and a tread are incorporated therein so as to complete a green tire.

Various types of such tire-forming drum of said second-stage apparatus have been proposed up to now, for example, there are such types as are disclosed in Japanese Patent Publications Nos. 5349/1978, 6266/1979 and 32544/1980.

So far as these types are concerned, all of them show a portion for the mounting of a cylindrical green case (so-called former ring) in the form of a cylindrical and integral body having a diameter larger than the internal diameter of the bead portion of the green case to be received thereby.

Therefore, in the case of mounting the green case preformed by an apparatus of the first stage on a drum of apparatus of the second stage, it becomes necessary to incline the green case in order to mount it over the flange of the drum which has a large diameter, to transform the shape of the bead portion once and for a while, or to remove one side of said flange temporarily. These operations cannot be carried out but by manual handling and this has become the cost factor for plant operation and has lowered the productivity.

On the other hand, as means for eliminating such inconvenience, for example, Japanese Patent Publication No. 37720/1975 discloses one type wherein the ring opposite to the headstock is capable of expanding and contracting.

However, when transforming the green case into a toroidal shape in cases where the tire shows the tendency of allowing the bead portion to be slipped inwardly from the viewpoint of the properties of structure of the tire to be transformed, it becomes necessary to provide a slip-regulating portion of a diameter larger than the internal diameter of the green case also inwardly of the aforesaid ring for the purpose of regulating such a slip of the tire and therefore, no sufficient effect can be expected thereof.

Also, it is considered that the ring at the headstock side (hereinafter called right-side) may be made expansive and contractive in the same manner as that of the side opposite to the headstock (hereinafter called left-side) but in such a case, there occurs the need for the provision of many pipes for supplying pressure air as a driving source for expansion and contraction of the ring. Specifically, the right-side requires two pipes, i.e., one for expansion and the other for contraction and two similar pipes for communication from the left-side to the right-side (pressure air may be supplied to the right-side from the right direction but it requires four pipes in all from the source of supply). Thus, at least two pipes will be necessary from the source of supply to the drum and according to this system of piping arrangements, the pipes are caused to pass inside the shaft in general and therefore, besides the aforesaid two pipes inside the shaft, one pipe for the supply of pressure air must be added for the purpose of making the tire into a toroidal shape, thus amounting to three pipes in all as a piping system. If so, the provision of three independent pipes inside the slender and long shaft is sure to result in increased cost of manufacture.

Moreover, even if the diameter of bead portion of a green case to be received is the same throughout, there are frequently differences in the holding diameter of the bead portion, depending on differences of tire size. For example, if the so-called diameter of a bead portion is 20", there are differences in the internal diameter of the bead portion of the green case depending on the difference in thickness for use in 10.00R20, 11.00R20 and 12.00R20 of different sizes and also depending on the difference in number (number of layers) of parts to be incorporated therein. Accordingly, in the case of providing an economical drum, namely in the case of forming several kinds of green cases of somewhat different diameters by the use of a single drum, delicate adjustment of the aforesaid drum cannot be performed satisfactorily at the time of expansion in diameter, and it is not only necessary to prepare a different drum per green cases of different diameter but also the productivity tends to be lowered on account of the replacement of the drum.

SUMMARY OF THE INVENTION

In view of all the foregoing, the present invention has been proposed and its object is to provide bead lock means for an economical tire-forming drum which is capable of easily establishing a green case and reducing the number of pipes for the supply of a pressure fluid.

In summary, the present invention is characterized by the fact that there are provided mutually separable and engageable shafts, a pair of left and right bead lock members consisting of a plurality of segments, each segment having one end pivoted to an outward position in a radial direction of said shafts and the other end adapted to expand and contract in the radial direction so as to hold the bead portion of a green case in substantially circular form, a slide member adapted to move in the axial direction of said shafts and connected to said segments through a link mechanism so as to expand and contract said segments in the radial direction at a time, a one-chamber type fluid pressure cylinder adapted to move said slide in the direction of expansion and contraction of said segments and spring means adapted to move said slide member in the direction of expansion and contraction of said segments.

With the aforesaid structure, the pair of left and right bead lock members in support of both bead portions of the green case to be received are able to expand and contract in the radial direction so that it is possible to mount the green case in an extremely easy manner and to regulate the inward slip of the bead portion also easily.

At the same time, the expansion and contraction of the segments constituting the bead lock members can be performed by means of a one-chamber type fluid pressure cylinder so that piping arrangements for the supply of a fluid will do with one pipe only for purposes of expansion and contraction of said segments, thus simplifying the structure of the assembly of the present invention and lowering the cost of manufacture.

The invention will be explained in detail with reference to a preferred embodiment in connection with the accompanying drawing.

BRIEF DESCRIPTION OF THE DRAWING

The drawing shows a cross section of one preferred embodiment of the invention wherein the left half and right half are different in phase in the circumferential direction and their conditions are shown in different positions of actuation.

DESCRIPTION OF THE PREFERRED EMBODIMENT

The drawing shows a cross-sectional view of a tire-forming drum wherein the axial line X—X is the central axial line of rotation of the drum, and the axial line Y—Y is the central position of the drum and at the same time, it shows the radial center of a tire to be formed.

To the left of the line Y—Y is shown a condition of the bead lock segment expanded in diameter, and to the right there is shown a condition of the same, but contracted in diameter, thus illustrating a cross section of a phase in the circumferential direction different from the left side of the figure.

Numeral 1 designates an internal shaft and 2 designates an external shaft, both of which are mounted on a base, the so-called headstock. The shafts are adapted to come close to and to be separated from each other, and they are rotatable as a body in any position.

The tire-forming drum is constituted by a left bladder clamp a, a right bladder clamp b, left bead lock means c, right bead lock means d and a bladder e gripped by the left and right bladder clamps a and b.

The left bladder clamp a is constituted by a clamp ring 3 having a disc portion formed with a groove at the external circumference for holding the left end portion of the bladder 3 and a check plate 4 removably attached to the disc portion so as to pinch the bladder e between the same and the disc portion.

The inside of the bladder e is kept air-tight by means of the check plate 4 and seal 5.

The clamp ring 3 is connected to the shaft 1 by means of a key 6 so that it can rotate together with the latter, and the external end portion of the clamp ring 3 is formed with a recess portion 7 for engagement with a projection of a sleeve 10 of bead lock means hereinafter referred to.

A pipe 8 is provided at a suitable place of the disc portion of the clamp ring 3 and this pipe 8 and the disc portion are so constituted as to keep the inside of the bladder air-tight.

On the other hand, the right bladder clamp b has the same structure as the left bladder clamp a except that the former is secured to the shaft 2 by means of a nut 9 and therefore, an explanation thereof is omitted here.

The left bead lock means c is provided with sleeve 10 having a disc portion, a slide 11 having a disc portion adapted to move on the sleeve in the axial direction only, a key 12 for guiding the slide 11 in the axial direction, a plurality of links 13 swingably mounted at suitable places of the slide 11, a plurality of bead lock segments 14, each segment having an arm with one end in communication with the link 13 and the other end swingably pivoted to the disc portion of the sleeve 10, one set or a plurality of sets of single chamber diaphragm-type cylinders 15 having one end attached to the disc portion of the sleeve 10 and the other end attached to the disc portion of the slide 11, a rod or spring shaft 16 having one end secured to the disc portion of the sleeve 10 and a spring seat at the top end of a projection from the disc portion of the slide 11, and a plurality of compressive coil springs 17 incorporated between the spring seat of the rod 16 and a spring seat at the side of the disc portion of the slide so as to exert a repellent force beforehand (that is springs 17 are precompressed).

In the right bead lock means d, as illustrated at the right side of the drawing (at the side of the right bead lock means d), the diaphragm-type cylinder 15 is extended in length, and in order to control the limit of movement of the slide 11 in the axial direction (i.e., control of the limit of expansion in diameter of the segment 14), there are provided a plurality of rods 18 and adjusting nuts 19 fixed to suitable places of the disc portion of the slide 11 and piercing the disc portion of the sleeve 10.

The sleeve 10 is pressed and secured to the clamp ring 3 by means of a nut 20 attached to the shaft 1 (that is, the clamp ring 3 is pressed against the shoulder of the shaft 1).

The coil springs 17 are arranged in mutual spacing between a plurality of links 13.

To said diaphragm-type cylinder 15 is connected a pressure-air pipe 21 passing the inside of the shaft 1 through a hose 22.

The top end of the plurality of segments 14 is formed into a U shape so as to grip the bead portion of a green case GC, such a shape being rendered suitable for grasping several kinds of tires and as shown in the right-side of the drawing, arrangements are made such that the adjacent segments do not interfere with each other at the time of their contraction.

On the other hand, the right bead lock means d has the same structure as the left bead lock means, except that the former is attached to the shaft 2 and therefore a detailed explanation thereof is omitted here.

In the diaphragm-type cylinder 15 (not shown) of the right bead lock means d, a hose (not shown) diverging from said hose 22 is connected to a pipe 8 of said bladder clamp a via a suitable spacing at the side of the bead lock means c and further connected to another pipe of said bladder clamp b so that pressure air can be supplied to the cylinder 15 via a suitable spacing of the bead lock means d.

At the same time, a coil-type air hose 23 is used so as to allow a change in length between the pipes 8 of said bladder clamps a and b due to their separation and approximation.

Moreover, pressure air is supplied to said bladder e from a hole 24 passing through the inside of the shaft 1 so as to expand the bladder e or contract it by discharging air from said hole 24.

According to the aforesaid structure, it is possible that the left bladder clamp a and the bead lock means c and the right bladder clamp b and the bead lock means d will be separated from each other or come close together and they rotate as a body in any position also and at the same time, the left and right bead lock means can be expanded or contracted almost at the same time.

In like manner, it is possible to change the limit of expansion in diameter of the segment 14 by the adjustment of the nut 19.

In addition, the replacement of the bladder e with a fresh one can be easily carried out by dismantling the left bead lock means c and moving the right bead lock means to the right.

Next, the action of the assembly of the present invention will be explained hereinafter.

Firstly, the bead lock segment 14 is brought to its contracted condition and the distance between the left and right bead lock segments is predetermined so as to fit the distance between the beads of a green case GC. In this condition, the supply of the green case GC is awaited.

In this case, the adjustment of the distance between the bead lock segments may be carried out on a base (not shown) by a known method.

The cylindrical green case GC formed at the first stage will be conveyed while holding the outside of the green case and inserted in the main drum from the left as shown in the drawing, and this insertion is stopped after the bead portions of the green case GC have been positioned outwardly of the bead lock segments 14.

This condition is shown by a dot-chain line at the right side of the FIGURE.

While the green case GC is held in this manner, the bead lock segments 14 at both sides are expanded in diameter until the bead holding portion 14' at the top end of the segment engages the bead portion of the green case GC and then the green case GC is supported inwardly of the bead in a manner coaxial with the line X—X.

This condition is shown at the left of the FIGURE.

When the green case GC is supported by the bead lock segment 14, the outward grasp of the green case by said green case transport means will be released and said transport means is returned to its original position in order not to disturb the action of the assembly on the main drum.

Subsequently, while supplying pressure air into the bladder e, the bead lock means c and d at both sides are caused to come close together whereby the cylindrical green case GC can be expanded in the form of a toroid.

While expanding the green case GC, a preformed belt and tread structure (not shown) are held at its outside and prepared for the center of the green case GC, i.e., in the position of the line Y—Y.

Upon termination of transformation of the cylindrical green case GC into a toroid, the green case thus toroidally-transformed is caused to adhere to the inside of the belt and tread structure and thereafter the means for transporting said belt-tread structure is returned to its original position so that it may not disturb the action of the assembly.

Subsequently, the green case GC and belt-tread structure are finally and mutually exactly pressed and formed by the so-called stitching apparatus to complete the production of a green tire.

When the green tire is completed, the means for transporting the belt-tread structure will move to the position of Y—Y of the drum once again and stop there so as to grasp the green tire from outside.

In this condition, the bead lock segment 14 of the main drum is contracted in diameter and simultaneously pressure air in the bladder e is discharged so that the green tire is transferred to said transport means which will grasp it and then the green tire will be taken out to the left of the main drum.

During this operation, the distance between the bead lock segments will be reduced to their initial extent and prepared for receiving a succeeding green case GC.

With all the aforegoing for using the main drum, it will be well understood that the cylindrical green case formed at the first stage can be automatically inserted and supported and also automatically formed into a toroid, then a belt-tread structure is also automatically incorporated therein to complete the formation of a green tire.

Accordingly, the aforesaid embodiment can ensure as many effects as will be explained hereinafter.

(1) It is possible to automatically insert, arrange and take out a green case and simultaneously to lessen the operator's labor to a large degree.

(2) As a pressure fluid pipe will do for diameter-expanding purposes only, it is possible to provide an economical drum and then an economical second stage apparatus.

(3) Since the limit of expansion of diameter of the bead lock segment can be changed, it is possible to form green cases of internal diameter of various kinds of bead portion, with one kind of drum even though the called diameters of the bead portion are the same.
  (i) Therefore, it is possible to provide an economical drum.
  (ii) By reducing the frequency of replacement of drums, it is possible to increase the time of actual production and therefore, the productivity can be enhanced.

(4) It is possible to reduce the period of time required for the replacement of a used bladder with a fresh one and to increase the time of actual production.

What is claimed is:

1. A bead lock device for a tire-forming drum, comprising mutually separable and engageable shafts, a left and a right bead lock member, each bead lock member comprising of segments, each segment having one end pivotably connected to one of said shafts and the other end adapted to expand and contract in diameter in the radial direction and to hold the bead portion of a green case in substantially cylindrical form, a right and a left slide member adapted to move in the axial direction of said shafts and each connected to said segments of said left and said right bead lock members respectively through a link member for expanding and contracting the diameter of said segments in the radial direction through a link mechanism, a one-chamber-type diaphram fluid pressure cylinder for moving said slide members in the direction of expansion of diameter of said segments, a spring for moving said slide members in the direction of contraction of said segments, and a rod and an adjusting nut for controlling the movement of each slide member.

2. A bead lock device according to claim 1, wherein one of said engageable shafts is hollow and is adapted to receive a fluid pressure, a hose communicating an interior of said hollow shaft with said diaphragm cylinder for pressurizing said diaphragm cylinder, a bladder connected between said engageable shaft and defining a pressure space, said hollow shaft having an opening therethrough communicating the interior of said hollow shaft with said pressure space so that pressure fluid supplied to said hollow shaft pressurizes said diaphragm cylinder and said pressure space for simultaneously separating said engageable shaft in the axial direction and for moving said segments radially outwardly.

3. A bead lock device comprising:
  a first shaft having an axis;
  a second shaft engaged with said first shaft and extending on said axis, said first and second shaft movable with respect to each other on said axis;
  a first sleeve fixed to said first shaft;
  a second sleeve fixed to said second shaft;

a first plurality of segments each having one end pivotably mounted to said first sleeve and an opposite end shaped to engage a bead of a green case for a tire, each of said first plurality of segments pivotable to move each opposite end radially outwardly and radially inwardly;

a second plurality of segments each having one end pivotably mounted to said second sleeve and an opposite end shaped to engage another bead of the green case for the tire, each of said second plurality of segments pivotable to move each opposite end radially outwardly and radially inwardly;

a first slide slideably mounted to said first sleeve;

a second slide slideably mounted to said second sleeve;

first lever means pivotably connected between each of said first plurality of segments and said first slide for pivoting said first plurality of segments with movement of said first slide;

second lever means pivotably mounted between said second plurality of segments and said second slide for pivoting said second plurality of segments with movement of said second slide;

a spring shaft connected to said first sleeve and extending through a portion of said first slide;

a spring engaged between said spring shaft and said portion of said first slide for biasing said first slide in a direction with respect to said first sleeve to pivot said first plurality of segments radially inwardly;

a single chamber diaphram cylinder engaged between said first sleeve and said portion of said first slide, activatable to move said first slide in a direction against said spring and to move said first plurality of segments radially outwardly; and a second rod connected to said second slide and extending through a portion of said second sleeve having stop means for restricting a relative movement between said second slide and said second sleeve.

* * * * *